United States Patent
Chen et al.

(10) Patent No.: US 8,984,052 B2
(45) Date of Patent: Mar. 17, 2015

(54) DATA CARD AND METHOD AND SYSTEM FOR CUSTOMIZING ITS APPLICATION SERVICE

(75) Inventors: Yuanyuan Chen, Shenzhen (CN); Daming Lu, Shenzhen (CN); Jiangfeng Shang, Shenzhen (CN)

(73) Assignee: ZTE Corporation (CN)

( * ) Notice: Subject to any disclaimer, the term of this patent is extended or adjusted under 35 U.S.C. 154(b) by 279 days.

(21) Appl. No.: 13/641,750

(22) PCT Filed: Apr. 15, 2011

(86) PCT No.: PCT/CN2011/072870
§ 371 (c)(1),
(2), (4) Date: Oct. 17, 2012

(87) PCT Pub. No.: WO2012/065401
PCT Pub. Date: May 24, 2012

(65) Prior Publication Data
US 2013/0036161 A1   Feb. 7, 2013

(30) Foreign Application Priority Data
Nov. 15, 2010   (CN) .......................... 2010 1 0546410

(51) Int. Cl.
*G06F 15/16*    (2006.01)
*H04W 4/00*    (2009.01)
*H04W 4/18*    (2009.01)
*H04W 8/18*    (2009.01)

(52) U.S. Cl.
CPC ................ *H04W 4/001* (2013.01); *H04W 8/18* (2013.01); *H04W 4/18* (2013.01)
USPC ........................................ 709/203; 709/200

(58) Field of Classification Search
USPC .................................. 709/203, 200, 220, 219
See application file for complete search history.

(56) References Cited

U.S. PATENT DOCUMENTS

| 2008/0176539 A1* | 7/2008 | Staton et al. ............... 455/414.1 |
| 2010/0037230 A1* | 2/2010 | Potonniee et al. ............ 718/103 |

FOREIGN PATENT DOCUMENTS

| CN | 1946203 A | 4/2007 |
| CN | 101321191 A | 12/2008 |
| CN | 1984690 A | 3/2011 |

(Continued)

OTHER PUBLICATIONS

PCT International Search Report Dated Aug. 25, 2011, Application No. PCT/CN2011/072870, Applicant ZTE Corporation et al., 3 Pages.

(Continued)

*Primary Examiner* — El Hadji Sall
(74) *Attorney, Agent, or Firm* — Brooks Kushman P.C.

(57) ABSTRACT

The present invention provides a method for customizing application services of a data card. The system comprises a data card and an over-the-air server. The method comprises: the data card sending an application service customization request to the over-the-air server when an application service is required to be customized; and the over-the-air server receiving the application service customization request, and then returning a configuration command corresponding to configuration information to the data card if it is determined that an operation of the data card to request customization of the application service is valid according to the stored and managed configuration information of all application services supported by the data card.

6 Claims, 3 Drawing Sheets

(56) References Cited

FOREIGN PATENT DOCUMENTS

| EP | 1895792 | A2 | 3/2008 |
| EP | 1937009 | A1 | 6/2008 |

OTHER PUBLICATIONS

Supplementary European Search Report Dated Jun. 27, 2014, Application No. 11 841 523.1, 5 Pages.

* cited by examiner

DATA CARD AND METHOD AND SYSTEM FOR CUSTOMIZING ITS APPLICATION SERVICE

CROSS-REFERENCE TO RELATED APPLICATIONS

This application is a U.S. national phase of PCT Application No. PCT/CN2011/072870 filed Apr. 15, 2011 which claims priority to Chinese Application No. 201010546410.8 filed Nov. 15, 2010, the disclosures of which are incorporated in their entirety by reference herein.

TECHNICAL FIELD

The present invention relates to a technology for customizing services of mobile communication terminals, and in particular, to a data card and a system and method for customizing application services thereof.

BACKGROUND OF THE RELATED ART

With increase of network bandwidth, especially popularization of 3G services, the application range of data cards (e.g., wireless or wired network cards) as mobile communication terminals is more and more extensive. Requirements for telephone service, short message, multimedia messaging service (MMS), instant message (IM), voice mail (VM), downloading and wireless internet, etc., grows day by day. These application services running on the data cards improve utility of terminals.

Under the push of service requirements, mobile terminals, such as data cards, using the requirements as guidance, adopts a relatively flexible configuration-file based customization strategy in the process of providing customization services of the data cards, so as to develop rapidly and efficiently terminal products which meet the service requirements. Under the state of the art, in order to meet the polytropic application service requirements, the configuration file of the original data card system is required to be modified to release a customized version.

However, such a customization method of the application services of the data cards is not flexible, and requires upgrading of the original data card system, therefore it cannot meet the demand of the fast changing user requirements, thereby decreasing the use experience of users while increasing terminal manufacturers' repeated test expenses of the upgraded version.

In order to update system software of mobile phones conveniently, manufacturers of mobile phone terminals use the Over-The-Air (OTA) technology to manage remotely mobile data and application software via air interfaces of a network such that the update of mobile phone systems can be completed conveniently by wireless downloading.

However, for mobile terminals, such as data cards, a method or system for customizing application services using the OTA technology has not been used yet at present. Manufacturers of the data cards need to research and develop such a method or system to overcome the original method or system's disadvantages of the inflexibility of customization of the application services and high upgrade cost of the terminals.

CONTENT OF THE INVENTION

A technical problem to be solved by the present invention is to provide a data card and a system and method for customizing application services thereof.

In order to solve the above-mentioned technical problem, the present invention provides a system for customizing application services of a data card comprising the data card and an over-the-air server, wherein the data card is configured to send an application service customization request to the over-the-air server, and customize a corresponding application service according to a configuration command returned by the over-the-air server; and the over-the-air server is configured to return the predefined configuration command to the data card if it is determined that an operation of the data card is valid according to the application service customization request sent by the data card.

Preferably, the over-the-air server is further configured to send an application service update request to the data card, and return the predefined configuration command to the data card if it is determined that the current configuration of the data card meets the service update requirement according to query information returned by the data card; and the data card is further configured to receive the application service update request and then return the query information to the over-the-air server if it is determined that the current configuration meets the service update requirement.

Preferably, the data card is further configured to customize or update the corresponding application service according to the received configuration command, and return an acknowledgment message to the over-the-air server.

Preferably, the system further comprises a customization proxy database connected to the over-the-air server, the data card comprising an over-the-air proxy module and a service database which are connected to each other, wherein the over-the-air proxy module is configured to query information of all supported application services from the service database, construct a data packet containing configuration information of the application service, which is requested to be customized, to send to the over-the-air server, customize the application service according to the configuration command returned by the over-the-air server, and return the acknowledgment message;

the service database is configured to store and manage a configuration file controlling service customization and information of all application services supported by the data card, including service types of the application services and their corresponding service customization request codes;

the customization proxy database is configured to store and manage configuration information and its corresponding configuration command of all application services supported by the data card, the configuration information including an application service customization request code, a model number and version number of the data card, and an international mobile equipment identity of the data card; and the over-the-air server is configured to receive the data packet, then compare the configuration information of the application service contained in the data packet with the configuration information of the corresponding application service queried from the customization proxy database, determine that the operation of the data card to request customization of the application service is valid if the configuration information of the application service contained in the data packet is consistent with the configuration information of the corresponding application service queried from the customization proxy database and it is determined that the data card has not requested customization of the same application service according to configuration records of the customization of the application service of the data card, and return the configuration command to the data card while recording the configuration of the application service of the data card.

Preferably, the over-the-air proxy module is configured to receive the application service update request sent by the over-the-air server, and then return the query information to the over-the-air server if it is determined from the service database that the current configuration meets the application service update requirement, update the application service according to the configuration command received from the over-the-air server, and send the acknowledgment message to the over-the-air server; and the over-the-air server is configured to return the configuration command to the data card if it is determined that the current configuration of the data card meets the service update requirement according to the query information returned by the data card, and record the configuration of the corresponding application service update of the data card.

In order to solve the above-mentioned technical problem, the present invention provides a data card able to customize application services comprising an over-the-air proxy module and a service database which are connected to each other, wherein the over-the-air proxy module is configured to send an application service customization request to an over-the-air server according to information of all supported application services queried from the service database, and customize a corresponding application service according to a configuration command returned by the over-the-air server; and the service database is configured to store and manage a configuration file controlling service customization and information of all application services supported by the data card, including service types of the application services and their corresponding service customization request codes.

Preferably, the over-the-air proxy module is configured to construct a data packet containing configuration information of the application service, which is requested to be customized, to send to the over-the-air server, customize the application service according to the configuration command, and then return an acknowledgment message to the over-the-air server.

The configuration information of the application service includes an application service customization request code, a model number and version number of the data card, and an international mobile equipment identity of the data card.

In order to solve the above-mentioned technical problem, the present invention provides a method for customizing application services of a data card, the method involving the data card and an over-the-air server and comprising:

the data card sending an application service customization request to the over-the-air server when an application service is required to be customized; and the over-the-air server receiving the application service customization request, and then returning a configuration command corresponding to configuration information to the data card if it is determined that an operation of the data card to request customization of the application service is valid according to the stored and managed configuration information of all application services supported by the data card.

Preferably, the method further comprises:

the over-the-air server sending an application service update request to the data card which requires service update;

the data card receiving the application service update request, and then returning query information to the over-the-air server if it is determined that the current configuration meets the service update requirement; and the over-the-air server sending the predefined configuration command to the data card if it is determined that the current configuration of the data card meets the service update requirement according to the received query information.

Preferably, the method further comprises:

the over-the-air server recording the configuration of the application service customization or update of the data card while sending the corresponding configuration command; and the data card customizing or updating the corresponding application service according to the received corresponding configuration command, and sending an acknowledgment message to the over-the-air server.

Preferably, the step of the over-the-air server returning the configuration command corresponding to the configuration information to the data card if it is determined that the operation of the data card to request customization of the application service is valid comprises:

the over-the-air server receiving a data packet, then comparing the configuration information of the application service contained in the data packet with the configuration information of the corresponding application service queried from a customization proxy database, and determining that the data card is legal if the configuration information of the application service contained in the data packet is consistent with the configuration information of the corresponding application service queried from the customization proxy database; and determining whether the data card has requested customization of the same application service according to configuration records of the customization of the application service of the data card, and if not, determining that the operation of the data card to request the customization of the application service is valid, and returning the configuration command to the data card, if yes, returning information indicating the application service has been customized to the data card.

Preferably, the step of the data card sending the application service customization request to the over-the-air server when the application service is required to be customized comprises:

the data card accessing to a built-in service database, querying service types and service request codes of all supported application services, constructing a data packet containing the configuration information of an application service, which is requested to be customized, to send to the over-the-air server, the configuration information contained in the data packet including an application service customization request code, a model number and version number of the data card, and an international mobile equipment identity of the data card.

The present invention can implement customization of individualized services of a data card rapidly and flexibly through the OTA technology compared with the prior art, that is, a user of the data card does not need to return the data card to the factory for upgrading and modification by its manufacturer when one or more application services are required to be customized, but the upgrading and modification can be implemented rapidly and conveniently by sending an OTA message carrying a configuration service request code. The data card can complete customization of the application services by modifying a configuration file of the data card through an OTA proxy module according to a service configuration command sent by an OTA server, thus not only the upgrade cost of the manufacturer of the data card is decreased, but also investment of the user is saved.

PREFERRED EMBODIMENTS OF THE PRESENT INVENTION

The technical scheme of the present invention will be described in detail below in conjunction with the accompanying drawings and embodiments. The embodiments exemplified below are intended to illustrate and explain the present invention only, and not to constitute a limitation to the technical scheme of the present invention.

Figure 1:
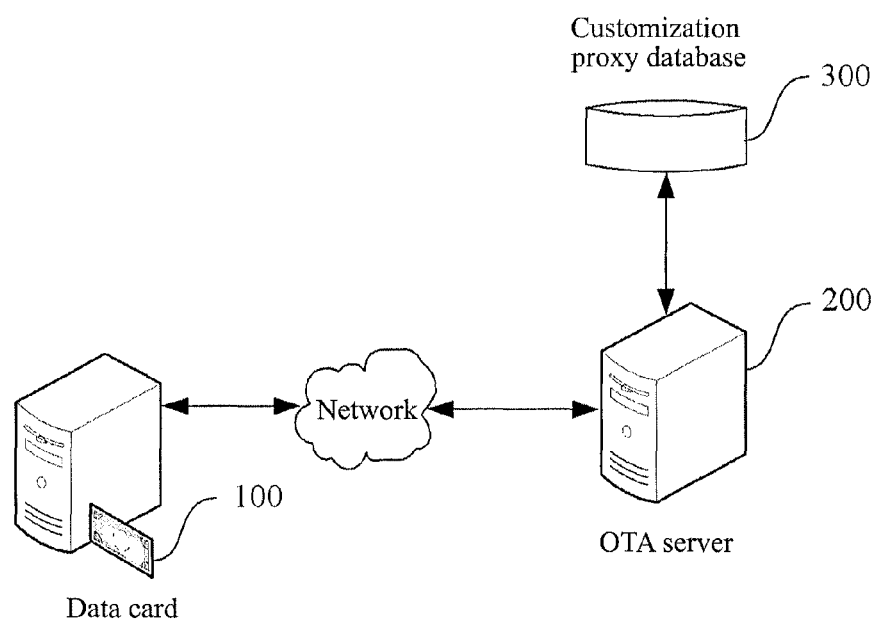
FIG. 1 is a framework diagram of a system embodiment for customizing application services of a data card in accordance with the present invention.

As shown in FIG. 1, a framework of a system embodiment for customizing application services of a data card in accordance with the present invention is provided. The system embodiment comprises a data card 100 and an over-the-air (OTA) server 200.

The data card 100, connected to the OTA server 200 through a network, is configured to send an application service customization request to the OTA server 200, and customize a corresponding application service according to a configuration command returned by the OTA server 200.

The OTA server 200 is configured to return the predefined configuration command to the data card 100 if it is determined that an operation of the data card is valid according to the application service customization request sent by the data card 100.

The OTA server 200 is further configured to send an application service update request to the data card 100, and return the predefined configuration command to the data card 100 if it is determined that the current configuration of the data card 100 meets the service update requirement according to query information returned by the data card 100.

The data card 100 is further configured to receiving the application service update request, and then return the query information to the OTA server 200 if it is determined that the current configuration meets the service update requirement.

The system embodiment shown in FIG. 1 further comprises a customization proxy database 300.

The customization proxy database 300 is configured to store and manage configuration information and its corresponding configuration command of all application services supported by the data card, wherein the configuration information includes an application service customization request code, a model number and version number of the data card and an international mobile equipment identity (IMEI).

The OTA server 200 returns the predefined configuration command to the data card 100 while recording the configuration result of the customization of the application service of the data card if it is determined that the operation of the data card to request the customization of the application service is valid according to the configuration information of the customization of the application service of the data card queried from the customization proxy database 300.

In another embodiment of the present invention, the customization proxy database 300 and the OTA server 200 can be combined into one single unit, that is, the customization proxy database can be included in the OTA server 200.

The data card 100 sends the application service customization request to the OTA server 200 when the application service is required to be customized, customizes the corresponding application service according to the configuration command returned by the OTA server 200, and sends an acknowledgment message to the OTA server.

The OTA server 200 receives the application service customization request sent by the data card 100, determines that the data card is legal from the configuration information queried from the customization proxy database 300, and determines whether the data card has requested the customization of the same application service according to configuration records of the customization of the application service of the data card, and if not, returns the configuration command to the data card, if yes, returns information indicating that the application service has been customized to the data card.

The OTA server compares an application service customization request code, a model number and version number of the data card and an IMEI contained in a data packet of the service customization request with the corresponding configuration information queried from the customization proxy database, and determines that the data card is legal if they are consistent.

The customization proxy database 300 usually stores the configuration information and the configuration command in the form of a two-dimensional table.

The OTA server 200 can also actively page the data card 100 required to update the service, send the service update request to the paged data card 100, return the predefined configuration command to the data card 100 if it is determined that the current configuration of the data card 100 meets the service update requirement according to query information returned by the data card 100, and record the configuration result of the service update.

The data card 100 receives the service update request, returns the query information to the OTA server if it is determined from a built-in service database that the current configuration meets the service update requirement, updates the service according to the configuration command received from the OTA server, and sends an acknowledgment message to the OTA server.

Figure 2:
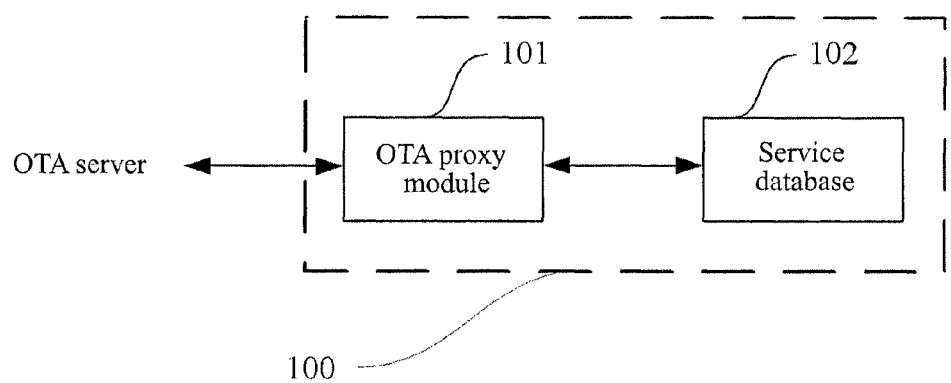
FIG. 2 is an internal structure diagram of a data card embodiment of the system embodiment shown in FIG. 1.

The data card 100 in the system embodiment for customizing application services of the data card customization shown in FIG. 1 is a data card able to customize the application services in accordance with the present invention, the structure of which, as shown in FIG. 2, comprises an OTA proxy module 101 and a service database 102 which are connected to each other.

The OTA proxy module 101 is configured to access to the service database 102 to query information of the supported application services, send the data packet of the constructed service customization request to the OTA server, customize a corresponding application services according to the configuration command returned by the OTA server 200, and send the acknowledgment message to the OTA server.

The information of the supported application services queried by the OTA proxy module 101 includes service types of all supported application services and their corresponding service customization request code. The information in the constructed data packet includes a service customization request code, a model number and version number of the data card and a IMEI of the data card.

The service database 102 is configured to store and manage a configuration file controlling the service customization and the information of the application services supported by the data card.

The OTA proxy module can implement dynamic expansion of the application services by altering the configuration file.

The information of the application services supported by the data card includes the types of all application services and the request codes corresponding to the application services.

The service database 102 is set by its equipment supplier when it goes out from the factory.

The OTA proxy module 101 receives the application service update request sent by the OTA server 200, then returns the query information to the OTA server if it is determined that the current configuration of the data card meets the service update requirement according to the configuration file queried from the service database 102 and the information of the supported application services, updates a service according to the configuration command received from the OTA server, and sends the acknowledgment message to the OTA server.

For the system embodiment described above, the present invention further provides a method embodiment for customizing application services of a data card comprising:

the data card sending an application service customization request to an OTA server when an application service is required to be customized; and the OTA server receiving the application service customization request, and then returning a predefined configuration command corresponding to configuration information to the data card if it is determined that an operation of the data card to request customization of the application service is valid.

The method system further comprises:

the OTA server sending an application service update request to the data card which requires service update;

the data card receiving the application service update request, and then returning query information to the OTA server if it is determined that the current configuration meets the service update requirement; and the OTA server sending the predefined configuration command to the data card if it is determined that the current configuration of the data card meets the service update requirement according to the received query information.

The method system further comprises:

the OTA server recording the configuration result of the customization of the application service or update of the data card while sending the corresponding configuration command; and the data card customizing or updating a corresponding application service according to the received corresponding configuration command, and sending an acknowledgment message to the OTA server.

Figure 3:
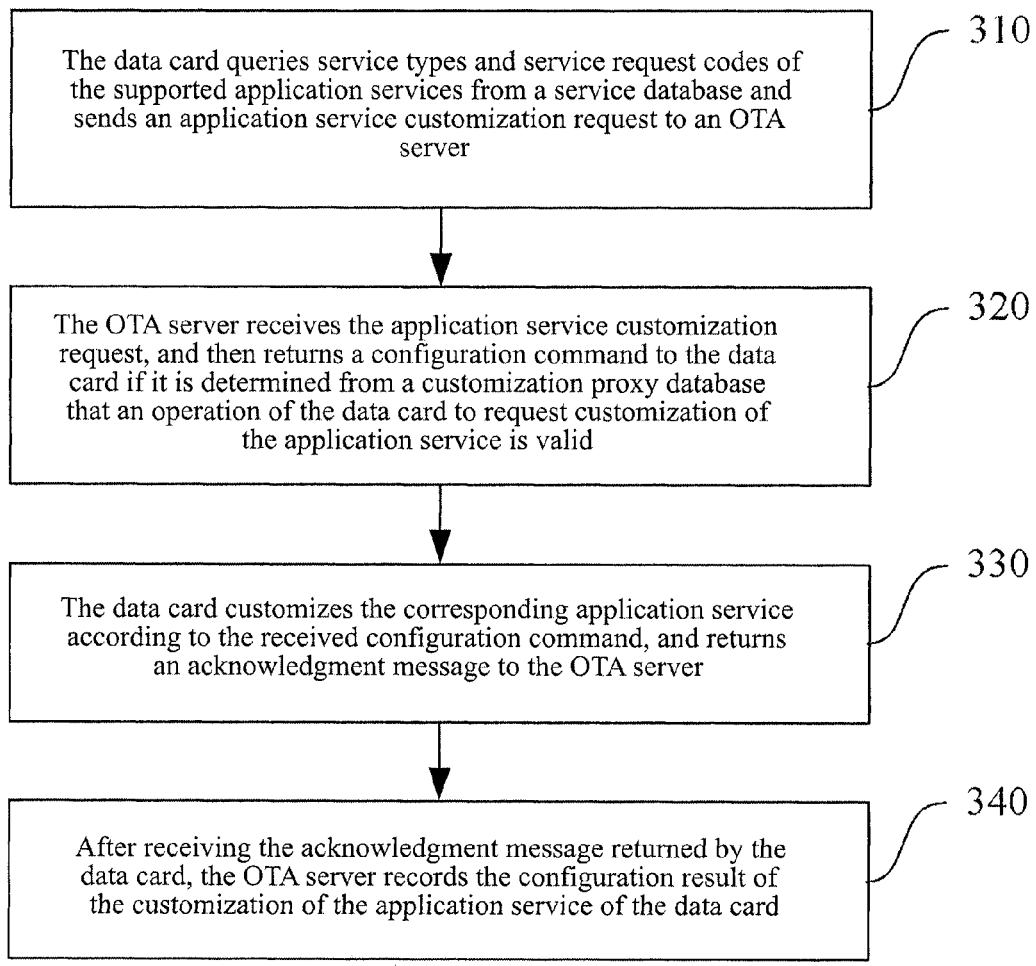
FIG. 3 is a flow chart of a service customization process initiated by a data card in a method embodiment of the present invention.

FIG. 3 shows a flow chart of a service customization process initiated by a data card in the method embodiment of the present invention described above. The process comprises the following steps.

In 310, the data card queries service types and service request codes of the supported application services from a service database and sends an application service customization request to an OTA server.

The data card accesses to the service database to query the service types and the service the request codes of the supported application services, sends a data packet of the constructed customization service request to the OTA server, wherein information in the data packet includes a request code of an application service required to be customized, an model number and version number of the data card and an IMEI of the data card.

In 320, the OTA server receives the application service customization request, and then returns a configuration command to the data card if it is determined from a customization proxy database that an operation of the data card to request customization of the application service is valid.

The OTA server compares the request code of the customized application service, the model number and the version number of the data card and the IMEI with the corresponding configuration information queried from the customization proxy database, and if they are consistent, determines that the data card is legal.

The OTA server determines that the data card which requests the customization of the application service is legal, and then determines whether the data card has requested customization of the same application service according to the configuration result of the customization of the application service of the data card, and if not, returns the predefined configuration command to the data card, otherwise, returns information indicating that the application service has been customized to the data card.

The OTA server determines whether the request code of the customized service, the model number of the data card and the software and hardware version number and the IMEI carried in the data packet are legal.

In 330, the data card customizes the corresponding application service according to the received configuration command, and returns an acknowledgment message to the OTA server.

In 340, after receiving the acknowledgment message returned by the data card, the OTA server records the configuration result of the customization of the application service of the data card.

Figure 4:
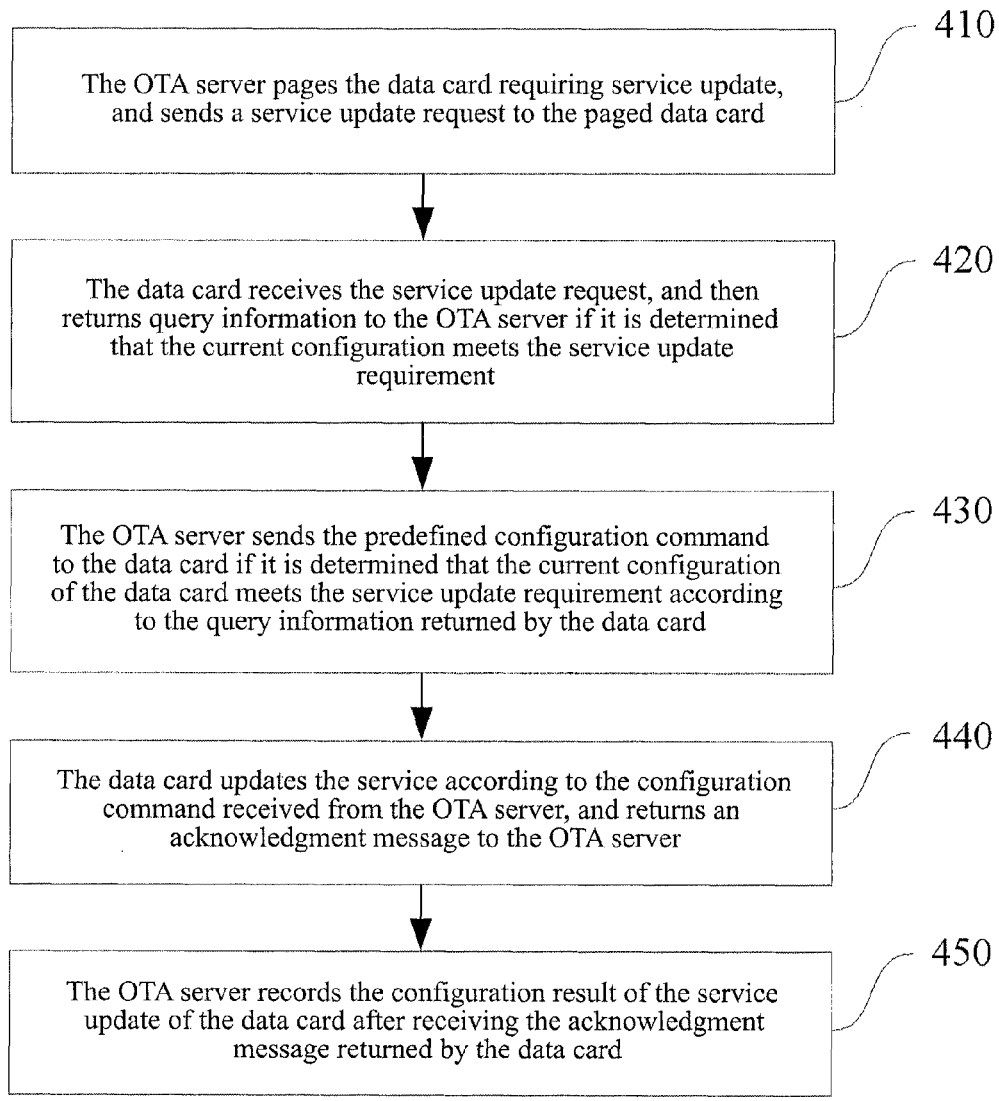
FIG. 4 is a flow chart of a service update process of a data card initiated by an operator in a method embodiment of the present invention.

FIG. 4 shows a flow chart of an application service update process of a data card initiated by a terminal equipment supplier through an OTA server in the method embodiment of the present invention described above. The process comprises the following steps.

In 410, the OTA server pages the data card requiring service update, and sends a service update request to the paged data card.

In 420, the data card receives the service update request, and then returns query information to the OTA server if it is determined that the current configuration meets the service update requirement.

The data card returns the query information to the OTA server if it is determined that the current configuration of the data card meets the service update requirement according to the configuration file queried from a built-in service database and information of the supported application services.

The information of the supported application services queried by the data card includes service types of all supported application services and their corresponding service customization request codes.

In 430, the OTA server sends the predefined configuration command to the data card if it is determined that the current configuration of the data card meets the service update requirement according to the query information returned by the data card.

In 440, the data card updates the service according to the configuration command received from the OTA server, and returns an acknowledgment message to the OTA server.

In 450, the OTA server records the configuration result of the service update of the data card after receiving the acknowledgment message returned by the data card.

It can be seen from the embodiments described above that the present invention enable a user of the data card to customize an application service conveniently without secondary development of the equipment supplier when the mobile application service is required to be customized, only the predefined configuration command is required be requested from the OTA server and be executed.

It may be understood by those skilled in the art that the corresponding equivalent modifications and variations may be made according to technical scheme and conception of the present invention. All of these modifications or variations should be covered in the protection scope of the appended claims of the present invention.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

Compared with the prior art, The present invention can implement customization of individualized services of a data card rapidly and flexibly through the OTA technology compared with the prior art, that is, a user of the data card does not need to return the data card to the factory for upgrading and modification by its manufacturer when one or more application services are required to be customized, but the upgrading and modification can be implemented rapidly and conveniently by sending an OTA message carrying a configuration service request code. The data card can complete customization of the application services by modifying a configuration file of the data card through an OTA proxy module according to a service configuration command sent by an OTA server, thus not only the upgrade cost of the manufacturer of the data card is decreased, but also investment of the user is saved.

What we claim is:

1. A system for customizing application services of a data card comprising the data card and an over-the-air server, wherein
the data card is configured to send an application service customization request to the over-the-air server, and customize a corresponding application service according to a configuration command returned by the over-the-air server; and
the over-the-air server is configured to return the predefined configuration command to the data card if it is determined that an operation of the data card is valid according to the application service customization request sent by the data card;
wherein the data card is further configured to customize or update the corresponding application service according to the received configuration command, and return an acknowledgment message to the over-the-air server;
the system further comprises a customization proxy database connected to the over-the-air server, the data card comprising an over-the-air proxy module and a service database which are connected to each other;
the over-the-air proxy module is configured to query information of all supported application services from the service database, construct a data packet containing configuration information of the application service, which is requested to be customized, to send to the over-the-air server, customize the application service according to the configuration command returned by the over-the-air server, and return the acknowledgment message;
the service database is configured to store and manage a configuration file controlling service customization and information of all application services supported by the data card, including service types of the application services and their corresponding service customization request codes;
the customization proxy database is configured to store and manage configuration information and its corresponding configuration command of all application services supported by the data card, the configuration information including an application service customization request code, a model number and version number of the data card, and an international mobile equipment identity of the data card; and
the over-the-air server is configured to receive the data packet, then compare the configuration information of the application service contained in the data packet with the configuration information of the corresponding application service queried from the customization proxy database, determine that the operation of the data card to request customization of the application service is valid if the configuration information of the application service contained in the data packet is consistent with the configuration information of the corresponding application service queried from the customization proxy database and it is determined that the data card has not requested customization of the same application service according to configuration records of the customization of the application service of the data card, and return the configuration command to the data card while recording the configuration of the application service of the data card.

2. The system according claim 1 wherein
the over-the-air server is further configured to send an application service update request to the data card, and return the predefined configuration command to the data card if it is determined that the current configuration of the data card meets the service update requirement according to query information returned by the data card; and
the data card is further configured to receive the application service update request and then return the query information to the over-the-air server if it is determined that the current configuration meets the service update requirement.

3. The system according to claim 1 wherein the over-the-air proxy module is configured to receive the application service update request sent by the over-the-air server, and then return the query information to the over-the-air server if it is determined from the service database that the current configuration meets the application service update requirement, update the application service according to the configuration command received from the over-the-air server, and send the acknowledgment message to the over-the-air server; and
the over-the-air server is configured to return the configuration command to the data card if it is determined that the current configuration of the data card meets the service update requirement according to the query information returned by the data card, and record the configuration of the corresponding application service update of the data card.

4. A method for customizing application services of a data card, the method involving the data card and an over-the-air server and comprising:
the data card sending an application service customization request to the over-the-air server when an application service is required to be customized; and the over-the-air server receiving the application service customization request, and then returning a configuration command corresponding to configuration information to the data card if it is determined that an operation of the data card to request customization of the application service is valid according to the stored and managed configuration information of all application services supported by the data card;

the method further comprising:

the over-the-air server recording the configuration of the application service customization or update of the data card while sending the corresponding configuration command; and the data card customizing or updating the corresponding application service according to the received corresponding configuration command, and sending an acknowledgment message to the over-the-air server;

wherein the step of the over-the-air server returning the configuration command corresponding to the configuration information to the data card if it is determined that the operation of the data card to request customization of the application service is valid comprises:

the over-the-air server receiving a data packet, then comparing the configuration information of the application service contained in the data packet with the configuration information of the corresponding application service queried from a customization proxy database, and determining that the data card is legal if the configuration information of the application service contained in the data packet is consistent with the configuration information of the corresponding application service queried from the customization proxy database; and determining whether the data card has requested customization of the same application service according to configuration records of the customization of the application service of the data card, and if not, determining that the operation of the data card to request the customization of the application service is valid, and returning the configuration command to the data card, if yes, returning information indicating the application service has been customized to the data card.

5. The method according to claim 4 further comprising:

the over-the-air server sending an application service update request to the data card which requires service update;

the data card receiving the application service update request, and then returning query information to the over-the-air server if it is determined that the current configuration meets the service update requirement; and the over-the-air server sending the predefined configuration command to the data card if it is determined that the current configuration of the data card meets the service update requirement according to the received query information.

6. The method according to claim 4 wherein the step of the data card sending the application service customization request to the over-the-air server when the application service is required to be customized comprises:

the data card accessing to a built-in service database, querying service types and service request codes of all supported application services, constructing a data packet containing the configuration information of an application service, which is requested to be customized, to send to the over-the-air server, the configuration information contained in the data packet including an application service customization request code, a model number and version number of the data card, and an international mobile equipment identity of the data card.

* * * * *